(12) United States Patent
Tanaka

(10) Patent No.: US 7,527,835 B2
(45) Date of Patent: May 5, 2009

(54) LIQUID CRYSTAL DISPLAY DEVICE

(75) Inventor: Takao Tanaka, Yachimata (JP)

(73) Assignee: Hitachi Displays, Ltd., Mobara-shi (JP)

(*) Notice: Subject to any disclaimer, the term of this patent is extended or adjusted under 35 U.S.C. 154(b) by 264 days.

(21) Appl. No.: 11/455,640

(22) Filed: Jun. 20, 2006

(65) Prior Publication Data

US 2006/0285055 A1    Dec. 21, 2006

(30) Foreign Application Priority Data

Jun. 20, 2005    (JP)    ............... 2005-178693

(51) Int. Cl.
*C09K 19/00*    (2006.01)
*C09K 19/52*    (2006.01)

(52) U.S. Cl. ............. 428/1.1; 252/299.01; 430/20; 349/156

(58) Field of Classification Search ................. 349/156; 430/20; 252/299.01; 428/1.1
See application file for complete search history.

(56) References Cited

U.S. PATENT DOCUMENTS

| 6,275,279 | B1 * | 8/2001 | Asuma et al. | ............... 349/153 |
| 6,888,608 | B2 * | 5/2005 | Miyazaki et al. | ............. 349/156 |
| 6,956,636 | B2 * | 10/2005 | Yanagawa | .................... 349/153 |
| 7,355,667 | B2 * | 4/2008 | Yanagawa | .................... 349/153 |

* cited by examiner

*Primary Examiner*—Geraldina Visconti
(74) *Attorney, Agent, or Firm*—Antonelli, Terry, Stout & Kraus, LLP.

(57) ABSTRACT

The present invention restricts the fluctuation of a gap among individual display devices. The display device includes two substrates which are arranged to face each other in an opposed manner with a liquid crystal material therebetween, an annular sealing material which is arranged on peripheries of the substrates, a first region which includes an image display region, and a second region which is separated from the first region by the partition member.

10 Claims, 9 Drawing Sheets

LIQUID CRYSTAL DISPLAY DEVICE

BACKGROUND OF THE INVENTION

1. Field of the invention

The present invention relates to a display device and a manufacturing method of a display device, and more particularly to a technique which is effectively applicable to a liquid crystal display panel which is manufactured using a liquid crystal material dropping method.

2. Description of the Related Art

As a display device of a television receiver set or a personal computer, a liquid crystal display panel has been used conventionally.

The liquid crystal display panel is formed by filling and sealing a liquid crystal material between two substrates on which transparent electrodes are formed. The liquid crystal display panel displays an image by controlling the transmission and the interruption of light by applying a voltage to the liquid crystal material.

Conventionally, as a method for filling and sealing the liquid crystal material in the liquid crystal display panel, in general, a vacuum sealing (filling) method has been used. In the vacuum sealing method, first of all, two substrates are adhered to each other using a sealing material. Here, the sealing material is formed in an annular shape while partially forming a gap therein. This gap is referred to as a filling port. The liquid crystal is filled into the inside of the sealing material from the filling port.

First of all, the filling port is immersed into the liquid crystal material in a vacuum atmosphere. Next, along with the increase of a pressure of an outer space, the liquid crystal is filled into a space surrounded by the substrates and the sealing material. Thereafter, the filling port is sealed with the sealing material thus completing the liquid crystal display panel.

However, the liquid crystal display panel which is used in a display device such as a television receiver set, recently, the large-sizing has been in progress and the filling of the liquid crystal material using the vacuum sealing method is becoming more and more difficult.

In view of such circumstances, as a sealing method of a liquid crystal material, a liquid crystal material dropping method has been proposed in U.S. Pat. No. 6,956,636 in place of the vacuum sealing method.

The above-mentioned liquid crystal material dropping method is a method which, for example, seals a liquid crystal material simultaneously when two substrates are adhered to each other. After forming the sealing material on one substrate in an annular shape, a liquid crystal material is dropped in the inside of a region which is surrounded by the sealing material. Thereafter, another substrate is overlapped to one substrate and two substrates are adhered to each other by hardening the sealing material thus completing a liquid crystal display panel.

In the above-mentioned liquid crystal material dropping method, a dropping quantity of the above-mentioned liquid crystal material is determined based on, for example, a height of spacers which determines a gap between two substrates and an area of a region surrounded by the sealing material.

However, in the liquid crystal material dropping method, for example, due to the irregularities of the dropping quantity of the liquid crystal material when the liquid crystal material is dropped, the dropping quantity of the liquid crystal material with respect to the space in which the liquid crystal material is sealed may be changed.

When the dropping quantity of the liquid crystal material is changed, there arise irregularities among individual products and hence, there arises a drawback that the characteristic of the display device differs among respective individual products.

SUMMARY OF THE INVENTION

A drawback that the present invention intends to overcome lies, as explained in the Description of the Related Art, in that the irregularities arise with respect to a dropping quantity of the liquid crystal material in manufacturing the liquid crystal display panel using the liquid crystal material dropping method.

Further, particularly, in case of the large-sized liquid crystal display panel, there exists a drawback that it is difficult to restrict the irregularities in the dropping quantity of the liquid crystal material due to a large size of an area of the panel thus lowering a manufacturing yield rate.

Further, along with the lowering of the manufacturing yield of the large-sized liquid crystal display panel, a manufacturing cost of the liquid crystal display panel is pushed up and, eventually, a manufacturing cost of a display device which uses the large-sized liquid crystal display panel is pushed up.

Accordingly, it is an object of the present invention to provide the structure which can correct the irregularities of gaps among individual products in a display device which uses liquid crystal, for example.

Another object of the present invention is, for example, in a manufacturing method of a liquid crystal display panel using a liquid crystal material dropping method, to provide a technique which can correct the irregularities in a dropping quantity of a liquid crystal material.

The objects and novel features of the present invention will become apparent based on the description of this specification and attached drawings.

To briefly explain the inventions disclosed in this specification, they are as follows.

In a display device which is provided with a liquid crystal display panel, the liquid crystal display panel includes two substrates which are overlapped to each other with a preset gap therebetween, an annular sealing material which separates a space defined between two substrates and a space defined outside the substrates, a liquid crystal material which is sealed in the inside of a space which is surrounded by two substrates and the sealing material, and a partition member which is arranged in the inside of a space which is surrounded by two substrates and the sealing material and outside an image display region and forms at least one small space region, wherein the small space region is spatially independent from a space region which includes the image display region by the partition member.

A vacuum may be created in the inside of the small space region.

The inside of the small space region may be filled with the liquid crystal material.

The liquid crystal display panel may include a plurality of small space regions, wherein a vacuum state may be created in at least one small space region, and the remaining small space regions may be filled with the liquid crystal material.

The partition member includes a first partition portion along the sealing material and second partition portions which connect the sealing material and the first partition portion thus dividing a space between the sealing material and the first partition portion into one or more small space regions.

Out of the second partition portions, the partition portions which separate the space region which includes the image display region and the small space regions are connected with the first partition portion at positions spaced apart from ends of the first partition portion by a preset distance.

The liquid crystal display panel includes two substrates which are overlapped to each other with a preset gap therebetween, an annular sealing material which separates a space defined between two substrates and a space defined outside the substrates, a liquid crystal material which is sealed in the inside of a space which is surrounded by two substrates and the sealing material, and a partition member which is arranged in the inside of a space which is surrounded by two substrates and a sealing material and outside an image display region and forms at least one small space region, wherein at least one small space region out of the small space regions is spatially continuously formed with a space region which includes the image display region.

The liquid crystal display panel includes a plurality of small space regions and at least one small space region is spatially independent from the space region which includes the image display region.

A vacuum is created in the small space region which is spatially independent from the space region which includes the image display region.

The small space region which is spatially independent from the space region which includes the image display region is filled with the liquid crystal material.

The liquid crystal display panel includes a plurality of small space regions which are spatially independent from the space region which includes the image display region and, out of the plurality of independent small space regions, a vacuum is created in at least one small space region and the remaining small space regions are filled with the liquid crystal material.

The partition member includes a first partition portion along the sealing material and second partition portions which connect the sealing material and the first partition portion thus dividing a space between the sealing material and the first partition portion into one or more small space regions, and the small space regions which are separated from the space region which includes the image display region by the second partition portions are spatially continuously formed with the space region which includes the image display region.

Out of the second partition portions, the partition portions which separate the space region which includes the image display region and the small space regions are connected with the first partition portion at positions spaced apart from ends of the first partition portion by a preset distance.

In a manufacturing method of a liquid crystal display panel which includes a sealing material coating step in which a sealing material is annularly applied to a first substrate, a liquid crystal material dropping step in which a liquid crystal material is dropped in the inside of a region of the first substrate which is surrounded by the sealing material, and a substrate adhering step in which a second substrate is overlapped to a surface of the first substrate on which the liquid crystal material is dropped and the first substrate and the second substrate are adhered to each other by the sealing material, wherein in the sealing material coating step, the sealing material is applied annularly and, at the same time, a partition member which forms at least one small region which is independent from a region which includes an image display region is applied in the region which is surrounded by the sealing material and outside the image display region, in the liquid crystal material dropping step, the liquid crystal material is dropped only in a region which includes the image display region in the inside of the region which is surrounded by the sealing material, and in the substrate adhering step, the second substrate is overlapped to the first substrate in a vacuum atmosphere, and the first substrate and the second substrate are adhered to each other by the sealing material and the partition member thus forming a small space region which is spatially independent from the space region which includes the image display region.

When a dropping quantity of the liquid crystal material is excessively large after the substrate adhering step, the partition member is cut or an opening is formed in the partition member thus moving an excessive amount of the liquid crystal material to the small space region.

In another manufacturing method of a liquid crystal display panel which includes a sealing material coating step in which a sealing material is annularly applied to a first substrate, a liquid crystal material dropping step in which a liquid crystal material is dropped in the inside of a region of the first substrate which is surrounded by the sealing material, and a substrate adhering step in which a second substrate is overlapped to a surface of the first substrate on which the liquid crystal material is dropped and the first substrate and the second substrate are adhere to each other by the sealing material, wherein in the sealing material coating step, the sealing material is applied annularly and, at the same time, a partition member which forms at least one small region which is independent from a region which includes an image display region is applied in the region which is surrounded by the sealing material and outside the image display region, in the liquid crystal material dropping step, the liquid crystal material is dropped in a region which includes the image display region and the small region in the inside of the region which is surrounded by the sealing material, and in the substrate adhering step, the second substrate is overlapped to the first substrate in a vacuum atmosphere, and the first substrate and the second substrate are adhered to each other by the sealing material and the partition member thus forming a small space region which is spatially independent from the space region which includes the image display region.

When a dropping quantity of the liquid crystal material which is dropped in the region which includes the image display region is short after the substrate adhering step, the partition member is cut or an opening is formed in the partition member thus moving the liquid crystal material in the small space region into the space region which includes the image display region.

In still another manufacturing method of a liquid crystal display panel which includes a sealing material coating step in which a sealing material is annularly applied to a first substrate, a liquid crystal material dropping step in which a liquid crystal material is dropped in the inside of a region of the first substrate which is surrounded by the sealing material, and a substrate adhering step in which a second substrate is overlapped to a surface of the first substrate on which the liquid crystal material is dropped and the first substrate and the second substrate are adhered to each other by the sealing material, wherein the sealing material coating step, the sealing material is applied annularly and, at the same time, a partition member which forms two or more small regions which are independent from a region which includes an image display region is applied in the region which is surrounded by the sealing material and outside the image display region, in the liquid crystal material dropping step, the liquid crystal material is dropped in a region which includes the image display region and at least one small region in the inside of the region which is surrounded by the sealing material, and in the substrate adhering step, the second substrate is overlapped to the first substrate in a vacuum atmosphere, and the first substrate and the second substrate are adhered to each other by the sealing material and the partition member thus forming a small space region which is spatially independent from the space region which includes the image display region.

When a dropping quantity of the liquid crystal material which is dropped in the region which includes the image display region is excessively large after the substrate adhering step, the partition member which separates the small space region in a vacuum state and the region which includes the image display region is cut or an opening is formed in the partition member thus moving an excessive amount of the liquid crystal material to the small space region in a vacuum state. On the other hand, when a dropping quantity of the liquid crystal material which is dropped in the region which includes the image display region is short, the partition member which separates the small space region which is filled with the liquid crystal material and the region which includes the image display region is cut or an opening is formed in the partition member thus moving the liquid crystal material in the small space region into the space region which includes the image display region.

The above-mentioned constitutions may be recapitulated as follows.

The present invention provides the display device which includes two substrates which are arranged to face each other in an opposed manner with the liquid crystal material therebetween, the annular sealing material which is arranged on peripheries of the substrates, the first region which includes the image display region, and the second region which is separated from the first region by the partition member.

The present invention provides the display device which includes a plurality of second regions, wherein a filling rate of the liquid crystal material of at least one second region is different form the filling rate of the liquid crystal material in other second regions.

The present invention provides the display device in which the partition member includes the first partition portion along the annular sealing material and the second partition portions which connect the annular sealing material and the first partition portion to each other thus dividing a space between the annular sealing material and the first partition portion into one or more regions.

The present invention provides the display device in which any one of the second partition portions includes a notch.

The present invention provides the manufacturing method of the liquid crystal display device which includes the first step in which the annular sealing material is formed on the first substrate, the second step in which the liquid crystal material is dropped in the inside of the region formed by the annular sealing material, and the third step in which the second substrate is overlapped to the first substrate, wherein simultaneously with the first step or the before second step, the step in which the separation region is formed by the sealing material is provided, and the liquid crystal material is not dropped in the separation region in the second step.

The present invention provides the manufacturing method of the display device which includes, after the third step, the step in which a portion of the separation region is cut out or an opening is formed in the portion of the separation region thus introducing the liquid crystal material into the separation region.

In the liquid crystal display panel used in the display device of the present invention, in the inside of the space which is surrounded by the substrates and the sealing material, the small space region which is spatially independent from the space region which includes the image display region is formed by the partition member.

Here, the small space region is held in a vacuum state. When such a liquid crystal display panel is manufactured, a quantity of the liquid crystal material which is dropped in the region which includes the image display region in the liquid crystal material dropping step may become larger than a preset dropping quantity thus generating a defect which is referred to as gravitational shift. Accordingly, when the gravitational shift is generated, the partition member is cut out or the opening is formed in the partition member and the excessive amount of the liquid crystal material is moved to the small space region whereby the gravitational shift can be corrected. Further, since the gravitational shift can be easily corrected, it is possible to suppress the lowering of a manufacturing yield rate of the liquid crystal display panel whereby it is possible to suppress the increase of the manufacturing cost of the liquid crystal display panel and a manufacturing cost of a display device which uses the liquid crystal display panel.

Further, in forming the small space regions in a vacuum state, it may be possible to form one small space region. However, it is preferable to form two or more small space regions. By providing two or more small space regions in a vacuum state, for example, it is possible to change the volume of the small space region which is spatially continuously formed with the space region which includes the image display region. Accordingly, in moving an excessive amount of the liquid crystal material to the small space region, it is possible to increase an amount of liquid crystal material which can be moved to the small space region and hence, it is possible to prevent a quantity of liquid crystal material in the inside of the space region which includes the image display region from being decreased.

Further, the small space region may be filled with the liquid crystal material. In manufacturing such a liquid crystal display panel, there may be a case that a quantity of liquid crystal material which is dropped in the region which includes the image display region in the liquid crystal material dropping step is smaller than a preset dropping quantity and hence, bubbles may be generated or a defect referred to as wipe displacement may occur.

Accordingly, when the bubbles are generated or the wipe displacement occurs, by cutting the partition member or by forming an opening in the partition member, the liquid crystal material which is filled in the small space region is moved to the space region which includes the image display region, that is, a shortage amount of the liquid crystal material in the space region which includes the image display region is replenished with the liquid crystal material which is filled in the small space region whereby it is possible to easily correct the generation of bubbles or the occurrence of wipe displacement.

Further, the generation of the bubbles or the occurrence of wipe displacement can be easily corrected and hence, the lowering of a manufacturing yield rate of the liquid crystal display panel can be suppressed whereby it is possible to suppress the increase of a manufacturing cost of the liquid crystal display panel and the manufacturing cost of the display device which uses the liquid crystal display panel.

Further, in forming the small space regions which are filled with the liquid crystal material, it may be possible to form one small space region. However, it is preferable to form two or more small space regions. By providing two or more small space regions which are filled with the liquid crystal material, it is possible to change the volume of the small space region which is spatially continuously formed with the space region which includes the image display region. Accordingly, when a shortage amount of the liquid crystal material in the space region which includes the image display region is replenished with the liquid crystal material which is filled in the small space regions, it is possible to replenish a proper quantity of the liquid crystal material thus realizing the proper correction.

Further, when the plurality of small space regions are formed, it may be possible to form the small space regions in a vacuum state and the small space regions which are filled with the liquid crystal material. In manufacturing the liquid crystal display panel using the liquid crystal material dropping method, in the liquid crystal material dropping step, there may be a case that a quantity of liquid crystal material which is dropped in the region which includes the image display region becomes larger than a preset dropping quantity as well as a case in which such quantity of the liquid crystal material becomes smaller than the preset dropping quantity. When the dropping quantity of the liquid crystal material which is dropped in the region which includes the image display region is excessively large, the partition member which separates the small space region in a vacuum state and the region which includes the image display region is cut or an opening is formed in such a partition member thus allowing the excessive amount of the liquid crystal material to move into the small space region in a vacuum state whereby the gravitational shift can be easily corrected.

Further, when the dropping quantity of the liquid crystal material which is dropped in the region which includes the image display region is short, the partition member which separates the small space region which is filled with the liquid crystal material and the region which includes the image display region is cut or an opening is formed in the partition member thus moving the liquid crystal material in the small space region into the space region which includes the image display region whereby the above-mentioned bubbles or wipe displacement can be easily corrected.

Here, in the correction step, for example, the partition member may be cut or the opening may be formed in the partition member by radiating laser beams to the partition member. Further, in place of cutting the partition member or forming the opening in the partition member, for example, a film which is formed on an adhesive interface between the first substrate or the second substrate and the partition member may be removed.

Further, when a plurality of small space regions is formed, volumes of respective small space regions may be equal to each other or different from each other. When the volumes of the respective small space regions are different from each other, by changing the combination of the small space regions which are continuously formed with the space region which includes the image display region, it is possible to largely vary the volume of the small space region which is continuously formed with the space region which includes the image display region.

Here, by making use of the sealing material as a portion of the partition member, it is possible to effectively make use of the sealing material and the space region which includes the image display region. Further, it is preferable that out of the partition portions, the partition portion which separates the space region which includes the image display region and the small space region is connected to another partition portion at a position which is spaced apart from the end of other partition portion by a preset distance.

In cutting the partition member or forming an opening in the partition member, in general, due to the radiation of laser beams to the partition member, cutting chip is generated and this cutting chip moves on the image display region thus giving rise to a defective display. Accordingly, by cutting the second partition portion or forming an opening in a second partition portion in the correction step, the cutting chip hardly moves on the image display region.

Further, the display device provided with the liquid crystal display panel to which the correction is performed in the correction step is configured to include the cut portion or the opening in the partition portion.

To recapitulate the constitution of the present invention, it is sufficient for the display device to possess the first region which includes the image display region and the second region which is separated from the first region. Here, provided that the second region is filled with the liquid crystal material, when the liquid crystal material in the first region is short, it is possible to replenish the liquid crystal material from the second region. Further, when the second region is not sufficiently filled with the liquid crystal material, it is possible to release the liquid crystal material to the second region when the liquid crystal material in the first region is excessively large.

Accordingly, by providing the plurality of second regions and by changing the liquid crystal filling rate, the present invention copes with both of the case that the liquid crystal material in the first region is short and the case that the liquid crystal material in the first region is excessively large. Further, when the liquid crystal material in the first region is short or excessively large, some of the second regions are connected with the first region and hence, some of the second partition portions assume a cutout state.

DETAILED DESCRIPTION OF THE PREFERRED EMBODIMENTS

Figure 1:
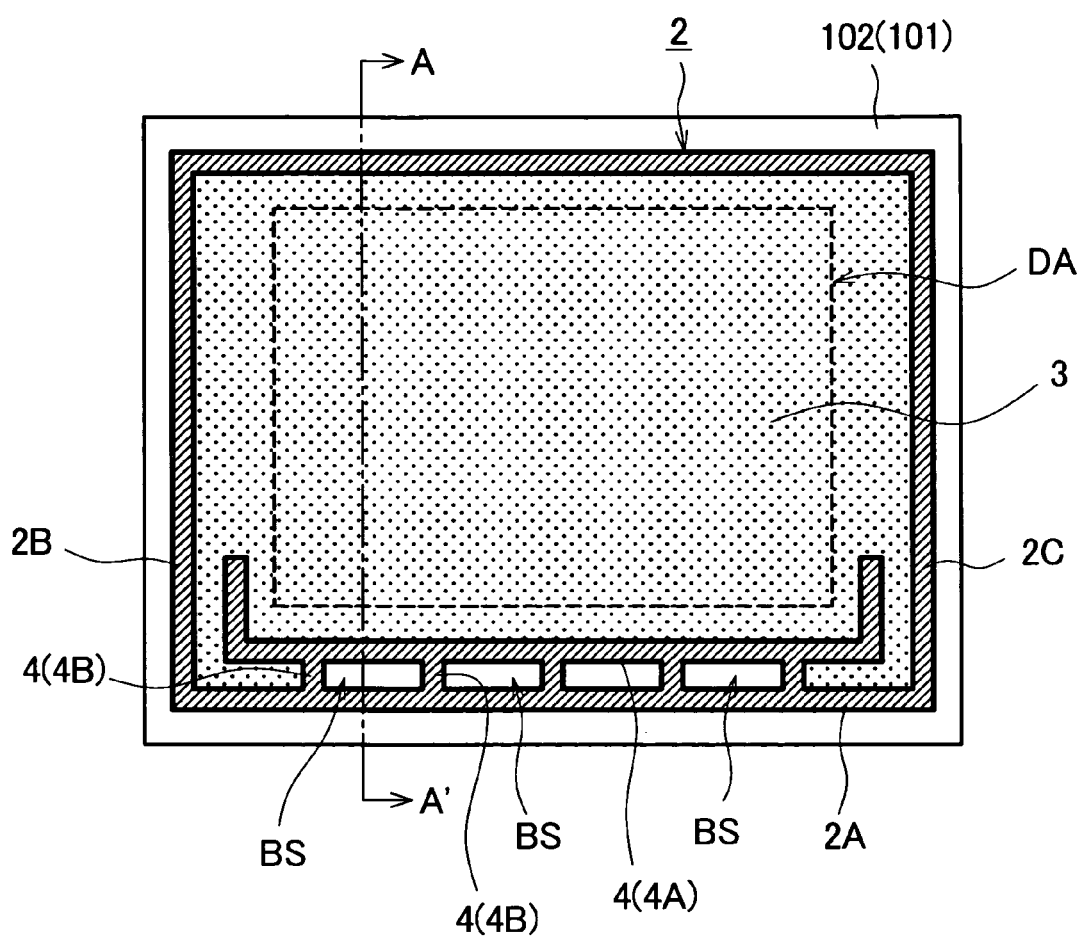
FIG. 1 is a schematic view showing the schematic constitution of a liquid crystal display panel according to a first embodiment of the present invention and also is a plan view of the liquid crystal display panel.

Hereinafter, the present invention is explained in detail in conjunction with modes for carrying out the invention (embodiments) by reference to drawings.

Here, in the drawings for explaining embodiments, parts which possess functions identical with the parts are given same symbols and their repeated explanation is omitted.

The liquid crystal display panel used in a display device of the present invention is a display panel which is manufactured by a manufacturing method which uses a liquid crystal material dropping method. In the manufacturing method which uses the liquid crystal material dropping method, a sealing material is annularly applied to a surface of a first substrate, a liquid crystal material is dropped in a region which is surrounded by the sealing material and, thereafter, the first substrate and the second substrate are adhered to each other using the sealing material in a state that the second substrate is overlapped to the first substrate, and a liquid crystal material is hermetically sealed.

In the present invention, in applying the sealing material, a partition member which forms one or more second regions which are independent from a first region which includes an image display region within a region which is surrounded by the sealing material and outside the image display region, the first substrate and the second substrate are adhered to each other using the sealing material and the partition member thus forming the second region which is spatially independent from the first region. Here, the second region is held in a vacuum state or in a state that the second region is filled with the liquid crystal material and hence, when a defect such as gravitational shift, bubbles or wipe displacement occurs, it is possible to easily correct the defects by cutting the partition member or forming the opening in the partition member.

Figure 2:
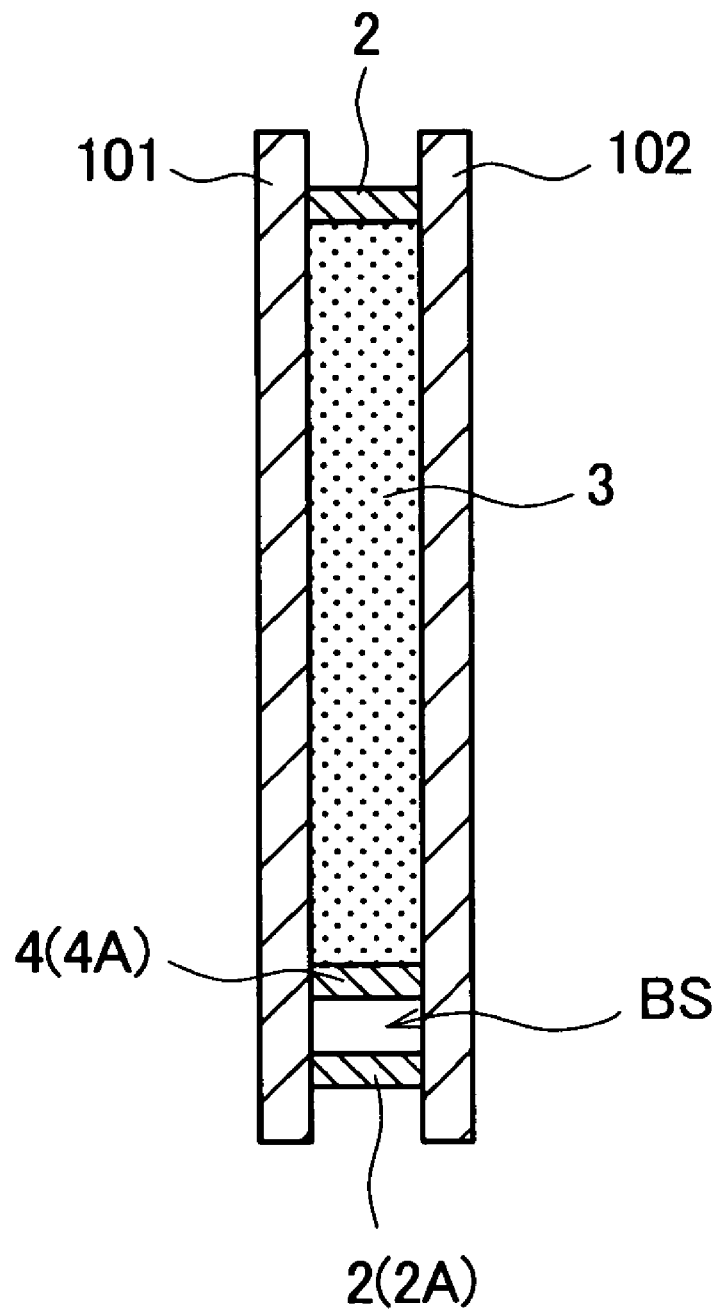
FIG. 2 is a schematic view showing the schematic constitution of the liquid crystal display panel according to the first embodiment of the present invention and also is a cross-sectional view taken along a line A-A' in FIG. 1.

FIG. 1 and FIG. 2 are schematic views showing the schematic constitution of a liquid crystal display panel according to the first embodiment of the present invention, wherein FIG. 1 is a plan view of the liquid crystal display panel and FIG. 2 is a cross-sectional view taken along a line A-A' in FIG. 1.

In FIG. 1 and FIG. 2, numeral 101 indicates a first substrate, numeral 102 indicates a second substrate, numeral 2 indicates a sealing material, numeral 3 indicates a liquid crystal material, numeral 4 indicates a partition member, symbol 4A indicates a first partition portion, symbol 4B indicates a second partition portion, symbol DA indicates an image display region, and symbol BS indicates a second region.

The liquid crystal display panel of this embodiment 1 includes, for example, as shown in FIG. 1 and FIG. 2, two substrates, that is, a first substrate 101 and a second substrate 102. These two substrates 101, 102 are overlapped to each other while forming a gap therebetween. A sealing material 2 is formed on peripheries of two substrates 101, 102. The annular sealing material 2 serves to separate a space defined between two substrates 101, 102 and a space defined outside the substrates 101, 102 from each other.

In the inside of a space which is surrounded by two substrates 101, 102 and the sealing material 2, a liquid crystal material 3 is sealed. Further, in the inside of the space which is surrounded by two substrates 101, 102 and the sealing material 2 and outside the image display region DA, a partition member 4 which forms one or more second regions BS is formed. Here, the second regions BS are, originally, as shown in FIG. 1 and FIG. 2, spatially arranged independently from a first region which includes the image display region DA by the partition member 4.

Further, the partition member 4 is, for example, as shown in FIG. 1, constituted of a first partition portion 4A along one side 2A of the sealing material 2, and second partition portions 4B which are connected with one side 2A of the sealing material 2 and the first partition portion 4A to define a plurality of second regions BS. Further, both ends of the first partition portion 4A respectively extend, for example, as shown in FIG. 1, to two sides 2B, 2C side which are joined to one side 2A of the sealing material and, thereafter, extend along two sides 2B, 2C.

Further, the first substrate 101 includes, for example, the image display region DA on a surface of a transparent substrate such as a glass substrate. Within this image display region DA, although not shown in the drawings, elements which apply a voltage to a liquid crystal material such as TFT elements are arranged in an array. Further, on the second substrate 102, for example, within the image display region DA of a transparent substrate such as a glass substrate, color filters and the like are formed.

Further, the liquid crystal display panel of this embodiment 1 is a general display panel which is used in a display device such as a liquid crystal display for a liquid crystal television receiver set or a personal computer. With respect to other constitutions and kinds of materials except for the partition member 4, the constitution and kinds of materials which are equal to the constitution and kinds of materials of a conventional liquid crystal display panel may be used. Accordingly, the explanation of the detailed constitution of the first substrate 101 and the second substrate 102, and materials of the sealing material 2 and the liquid crystal material 3 is omitted.

Further, the display device which uses the liquid crystal display panel of this embodiment 1 may be, for example, a display device of a liquid crystal display for a liquid crystal television receiver set or a personal computer and may have the constitution substantially equal to the constitution of the display device used in a conventional liquid crystal display panel and hence, the detailed explanation of the display device is omitted.

The liquid crystal display panel of this embodiment 1, that is, the liquid crystal display panel shown in FIG. 1 and FIG. 2 is, for example, a general display panel which is used as the display device such as a liquid crystal display for a liquid crystal television receiver set or a personal computer and, recently, the large sizing of such liquid crystal display panel is in progress. Here, the liquid crystal display panel is, for example, manufactured in accordance with following steps.

In manufacturing the liquid crystal display panel of this embodiment 1, first of all, for example, the sealing material 2 is annularly applied to a surface of the first substrate 101. For example, the sealing material 2 is made of a thermosetting resin such as an epoxy resin or an ultraviolet curing resin, and assumes an unhardened state at a sealing-material applying stage. Further, in manufacturing the liquid crystal display panel of this embodiment 1, along with the applying of the sealing material 2, for example, the partition member 4 having a pattern shown in FIG. 1 is applied. Here, the partition member 4 is made of the same material as the sealing material 2.

After applying the sealing material 2 and the partition member 4 to the surface of the first substrate 101, subsequently, the liquid crystal material 3 is dropped in the region surrounded by the sealing material 2 on the surface of the first substrate 101. A dropping quantity of the liquid crystal material 3 is, for example, determined by estimating a volume of a space region which is surrounded by two substrates 101, 102 and the sealing material 2 based on a height of spacers (not shown in the drawing) which are interposed between the first substrate 101 and the second substrate 102 and the sealing material 2. Further, in manufacturing the liquid crystal display panel of this embodiment 1, the liquid crystal material 3 is dropped only in the first region which includes the image display region DA out of the region which is surrounded by the sealing material 2.

When the liquid crystal material 3 is dropped on the surface of the first substrate 101, the second substrate 102 is overlapped to the first substrate 101, and the sealing material 2 and the partition member 4 are hardened to adhere the first substrate 101 and the second substrate 102 to each other and, at the same time, the liquid crystal material 3 is sealed. By taking these steps, the liquid crystal display panel shown in FIG. 1 and FIG. 2 are obtained.

Figure 3:
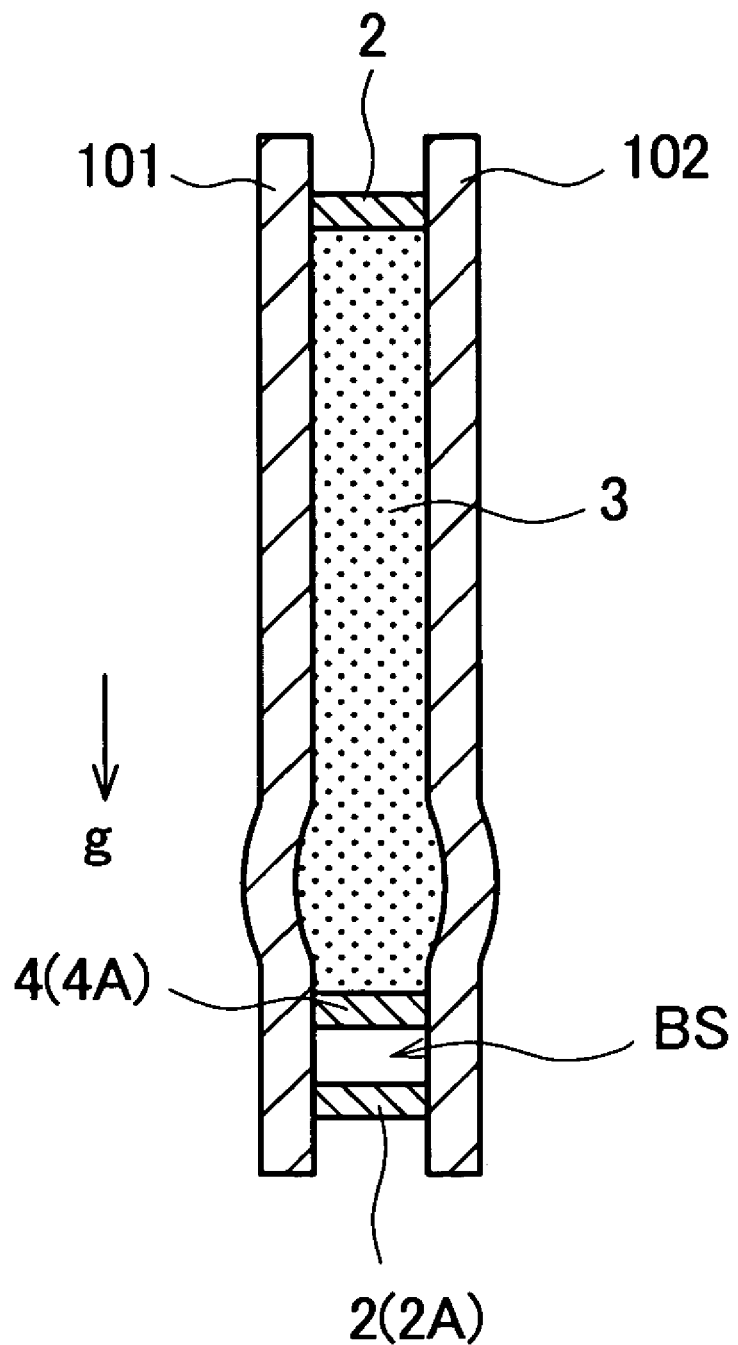
FIG. 3 is a schematic view for explaining one example of a defect which can be corrected using the liquid crystal display panel and a correcting method of the defect according to the first embodiment and also is a cross-sectional view showing one example of the defect which is generated.
Figure 4:
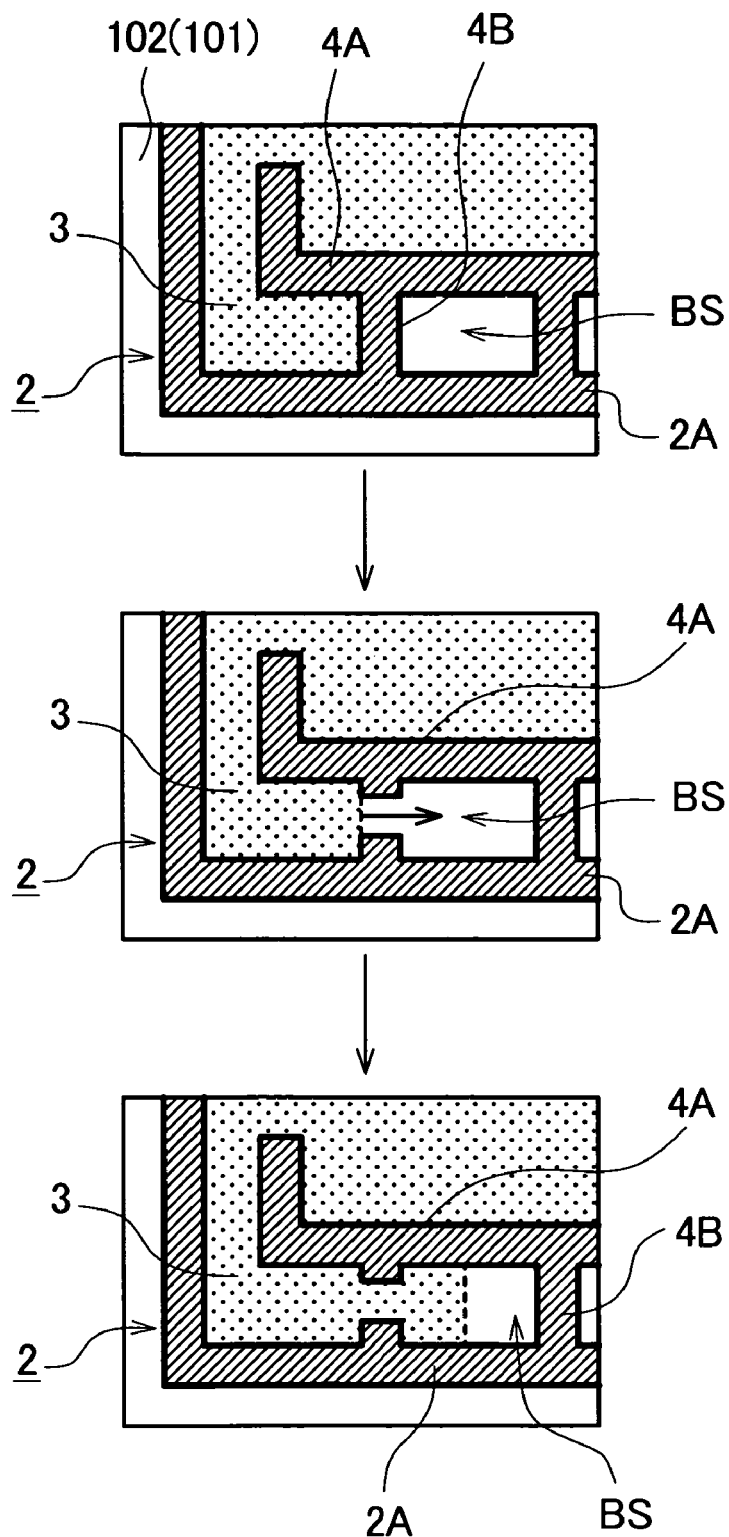
FIG. 4 is a schematic view for explaining one example of a defect which can be corrected using the liquid crystal display panel and the correcting method of the defect according to the first embodiment and also is a partially enlarged plan view with a part for explaining the correcting method.

FIG. 3 and FIG. 4 are perspective views for explaining one example of a defect which can be corrected using the liquid crystal display panel of this embodiment 1 and a correcting method of the defect, wherein FIG. 3 is a cross-sectional view showing one example of the generated defect and FIG. 4 is a partially enlarged plan view for explaining the correcting method. Here, FIG. 3 is a view which shows the same cross section as FIG. 2.

When the liquid crystal material 3 is hermetically sealed (sealed) using the liquid crystal material dropping method as in the case of the manufacturing method of the liquid crystal display panel of this embodiment 1, the dropping quantity of the liquid crystal material 3 is, as described above, estimated and determined based on the height of the spacers and the area of the region surrounded by the sealing material 2. However, in dropping the liquid crystal material 3, there arise irregularities with respect to the dropping quantity. Accordingly, the dropping quantity of the liquid crystal material 3 becomes larger than a preset dropping quantity and hence, for example, a defect which is referred to as gravitational shift may arise. As shown in FIG. 3, for example, the gravitational shift is defect that an excessive amount of the dropped liquid crystal material 3 dwells on a lower portion of the liquid crystal display panel due to gravity. When such a defect occurs, for example, a control of the orientation of display panel molecules in a lower portion of the liquid crystal display panel becomes insufficient and hence, an image quality which is displayed on a lower portion of the image display region DA is lowered.

In the manufacturing method of the liquid crystal display panel of this embodiment 1, when the gravitational shift shown in FIG. 3 occur after manufacturing the liquid crystal display panel in accordance with the above-mentioned steps, for example, as shown in an upper stage and middle stage of FIG. 4, out of the partition member 4, the second partition portion 4B which partitions the first region which includes the image display region DA and the second region BS is cut out so as to allow the second region BS to be spatially continuously formed with the first region. The cutting of the second partition portion 4B is performed by radiating laser beams to the second partition portion 4B, for example.

Here, when the second region BS is held in a vacuum, as shown in the middle stage and a lower stage of FIG. 4, the liquid crystal material 3 which is sealed in the first region which includes the image display region DA flows into the second region BS. In other words, it is possible to release an excessive amount of the liquid crystal material 3 sealed in the first region into the above-mentioned second region BS. Accordingly, it is possible to easily correct the gravitational shift.

Here, when the second partition portion 4B which is cut out or in which an opening is formed is, for example, as shown in FIG. 1 and FIG. 4, arranged at a position spaced apart from the first partition portion 4A by a preset distance, for example, a cutting chip which is generated when the second partition portion 4B is cut using laser beams or the like hardly moves on the image display region DA and hence, a defective display of an image hardly occurs.

Further, although the detailed explanation is omitted, when the gravitational shift still remain after performing the correcting operation in accordance with steps shown in FIG. 4, for example, the second partition portion 4B which partitions the second region BS in which the liquid crystal material 3 flows and the second region BS which is arranged close to the second region BS in which the liquid crystal material 3 flows may be cut out.

When the dropping quantity of the liquid crystal material 3 becomes larger than the preset dropping quantity, there arise irregularities also with respect to an excessive amount of the dropping quantity. Accordingly, for example, as shown FIG. 1, by providing the plurality of second regions BS in a vacuum state, it is possible to control the number (volume) of the second regions BS which are spatially continuously formed with the first region which includes the image display region DA corresponding to the excessive amount and hence, the proper correction can be performed.

As has been explained above, according to the liquid crystal display panel of this embodiment 1, at the time of manufacturing, by providing the second regions BS in a vacuum state which are separated and are formed independently from the first region which includes the image display region DA by the partition member 4, it is possible to easily correct the gravitational shift. Further, it is possible to suppress the lowering of a manufacturing yield rate of the liquid crystal display panel whereby the increase of the manufacturing cost of the liquid crystal display panel and a manufacturing cost of the display device which uses the liquid crystal display panel can be suppressed.

Particularly, in manufacturing the large-sized liquid crystal display panel such as a liquid crystal display for a liquid crystal television receiver set or a personal computer, it is difficult to suppress the dropping quantity of the liquid crystal material 3 within a range which prevents the occurrence of gravitational shift. By adopting the constitution which can easily correct the gravitational shift as in the case of this embodiment 1, it is possible to suppress the lowering of the manufacturing yield rate of the liquid crystal display panel.

Further, for example, as shown in FIG. 1, by forming the second regions BS using the partition member 4 which is constituted of the first partition portion 4A arranged along the sealing material 2 and the second partition portion 4B which connects the sealing material 2 and the first partition portion 4A, it is possible to effectively make use of the space defined between the sealing material 2 and the image display region DA. Accordingly, for example, it is possible to provide the liquid crystal display panel which can easily correct the gravitational shift without increasing the area of the region which is surrounded by the sealing material 2, that is, the areas of two substrates 101, 102 for providing the second regions BS.

Further, in this embodiment 1, as an example of defects which occur on the liquid crystal display panel, the gravitational shift is named. However, types of defects are not limited to the gravitational shift. For example, even when a defect which is referred to as a high-temperature gap in which the liquid crystal material 3 dwells in a lower portion of the image display region DA at a high temperature occurs, by adopting the constitution described in this embodiment 1, it is possible to easily correct the high-temperature gap irregularities.

Further, for example, as shown in FIG. 1, by connecting the second partition portion 4B which partitions the first region which includes the image display region DA and the second region BS to the first partition portion 4A at the position spaced apart from the end of the first partition portion 4A by the preset distance, cutting chip which is generated when the second partition portion 4B is cut hardly moves on the image display region DA and hence, the defective display of the image attributed to the cutting chip can be prevented.

Further, in this embodiment 1, as shown in FIG. 4, the second region BS is spatially continuously formed with the first region which includes the image display region DA by cutting out the second partition portion 4B. However, the spatial connection between the second region BS and the first region is not limited to such cutting of the second partition portion 4B. For example, the second region BS and the first region may be connected with each other by forming an opening in the second partition portion 4B, or a film which exist in an adhesive interface between either one of two substrates 101, 102 and the partition member 4 may be removed to spatially connect the second region BS and the first region.

Further, in this embodiment 1, as the constitutional example of the liquid crystal display panel which is provided with the second regions BS, as shown in FIG. 1, the example in which four second regions BS which have the substantially equal volume are provided is described. However, the constitutional example of the liquid crystal display panel provided with the second region BS is not limited to such a constitution and it is sufficient that one or more second regions BS are provided. Further, the partition member 4 is not limited to a shape shown in FIG. 1 and may be formed in an annular shape which is separated from the sealing material 2, for example.

Further, in this embodiment 1, the partition member 4 is made of the same material as the sealing material 2 and the partition member 4 is applied simultaneously with the step in which the sealing material 2 is applied. However, the applying of the partition member 4 is not limited to such a mode, and the partition member 4 may be made of a material different from a material of the sealing material 2, and the partition member 4 may be applied or formed after applying the sealing material 2 and, at the same time, before dropping the liquid crystal material.

Figure 5:
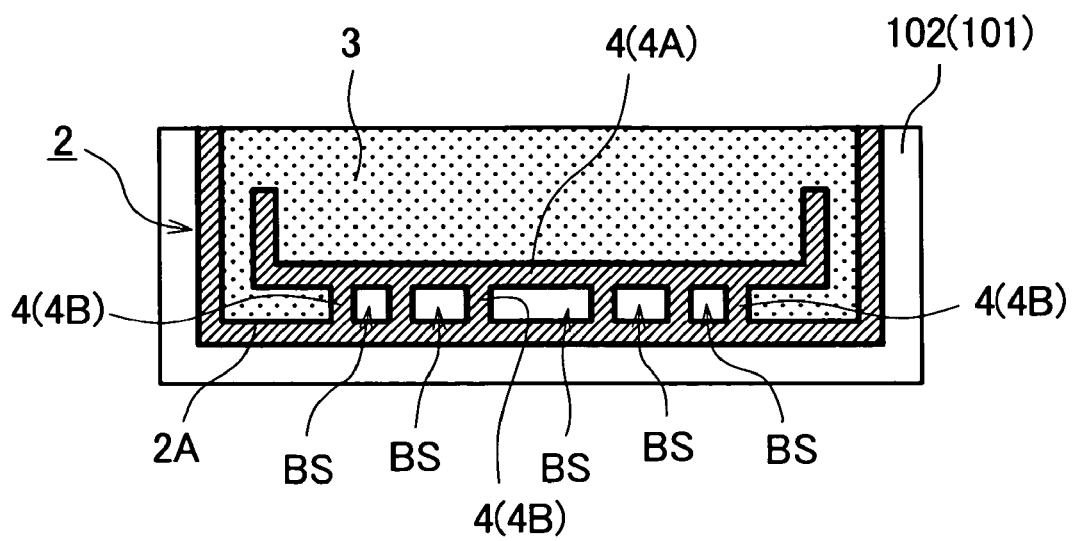
FIG. 5 is a schematic view showing a modification of the liquid crystal display panel according to the first embodiment and also is a view showing the modification when volumes of a plurality of small space regions are changed.
Figure 6:
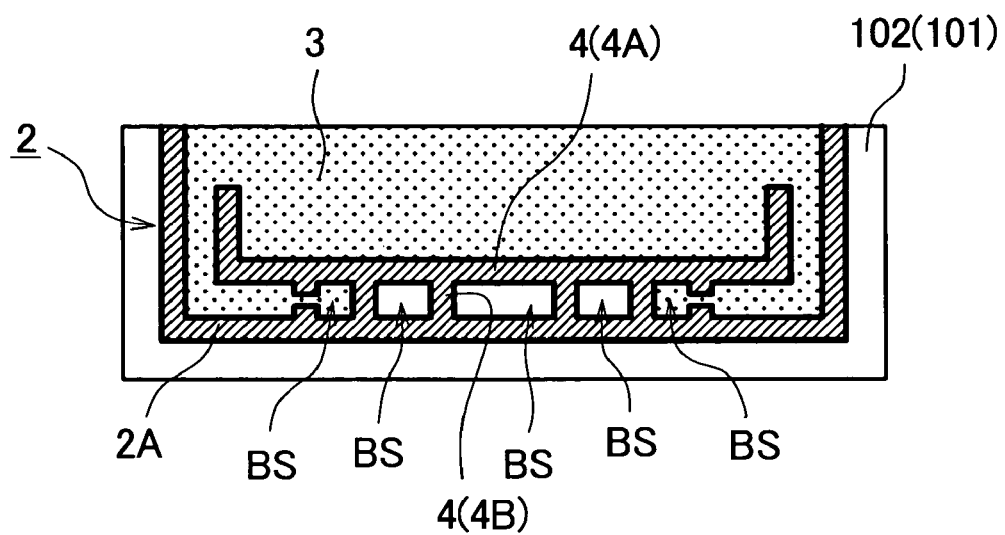
FIG. 6 is a schematic view showing a modification of the liquid crystal display panel according to the first embodiment and also is a view showing the modification of a correcting method of gravitational shift.
Figure 7:
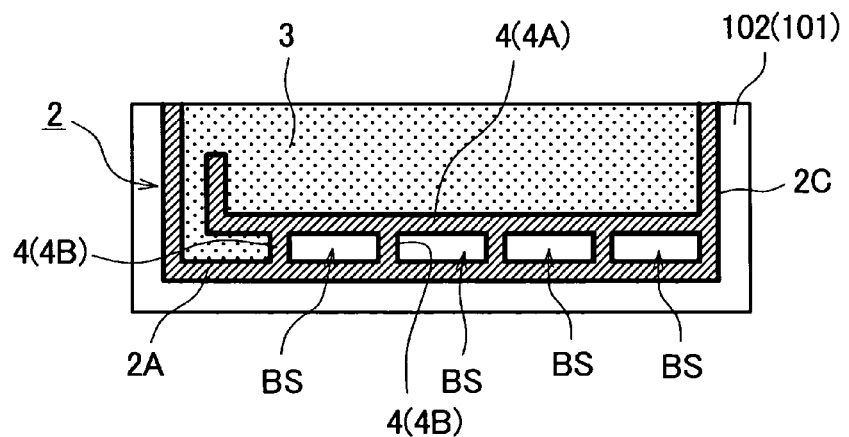
FIG. 7 is a schematic view showing a modification of the liquid crystal display panel according to the first embodiment and also is a view showing the modification of a partition member.

FIG. 5 to FIG. 7 are schematic views showing modifications of the liquid crystal display panel according to the first embodiment, wherein FIG. 5 is a view showing the modification when volumes of a plurality of second regions are changed, FIG. 6 is a view showing the modification of a correcting method of gravitational shift and FIG. 7 is a view showing the modification of the partition member.

In the embodiment 1, as shown in FIG. 1, the example of the liquid crystal display panel which is provided with the plurality of (four) second regions BS having the substantially equal volume is described. However, the present invention is not limited to such an example. For example, as shown in FIG. 5, the liquid crystal display panel may be provided with the plurality of second regions BS which differ in volume from each other.

Further, in correcting the gravitational shift generated on the liquid crystal display panel, the liquid crystal material 3 may be moved to the second region BS from two directions, that is, the left and right directions as shown in FIG. 6, for example, instead of moving the liquid crystal material 3 from one direction. By adopting such a constitution, it is possible to uniformly move an excessive amount of the liquid crystal material 3 which dwells in the lower portion of the image display region DA due to gravity to the second region BS.

Further, in FIG. 1, FIG. 5 and FIG. 6, both ends of the first partition portion 4A are separated from the sealing material 2. However, the present invention is not limited to such a constitution. For example, as shown in FIG. 7, one end of the first partition portion 4A may be connected with the sealing material 2.

Further, in FIG. 1, FIG. 5, FIG. 6 and FIG. 7, the partition member 4 is arranged at a lower portion on paper, that is, on a lower side of the imaged is play region DA. However, the present invention is not limited to such a constitution. That is, the partition member 4 may be formed on an upper side, a left end side or a right end side of the image display region DA.

Embodiment 2

Figure 8:
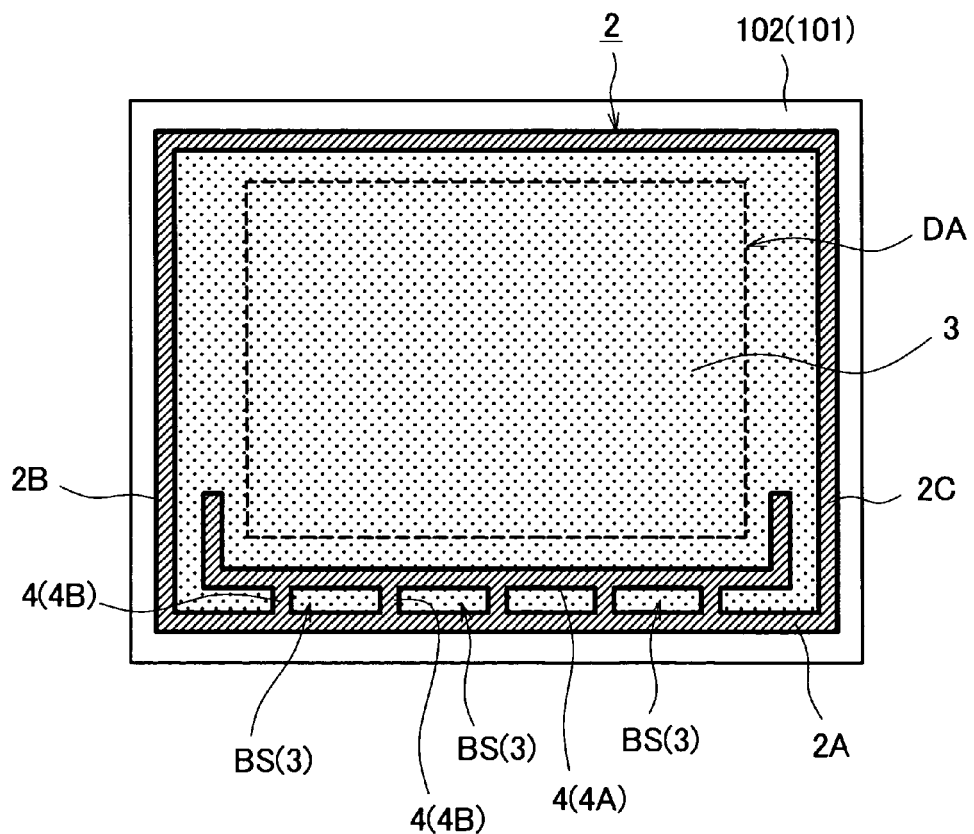
FIG. 8 is a schematic plan view showing the schematic constitution of a liquid crystal display panel according to a second embodiment of the present invention.

FIG. 8 is a schematic plan view showing the schematic constitution of a liquid crystal display panel according to a second embodiment of the present invention.

The liquid crystal display pane of this embodiment 2 includes, for example, as shown in FIG. 8, two substrates consisting of a first substrate 101 and a second substrate 102, an annular sealing material 2 which separates a space defined between two substrates 101, 102 and a space outside the substrates 101, 102, a liquid crystal material 3 which is sealed in the inside of a space which is surrounded by two substrates 101, 102 and a sealing material 2, and a partition member 4 which forms one or more second regions BS in the inside of the space which is surrounded by two substrates 101, 102, and the sealing material 2 and outside an image display region DA. Here, the second region BS is, originally, in the same manner as the liquid crystal display panel of this embodiment 1, formed spatially separately and independently from the first region which includes the image display region DA by the partition member 4.

Further, the partition member 4 is, for example, as shown in FIG. 8, constituted of a first partition portion 4A along one side 2A of the sealing material 2, and second partition portions 4B which are connected with one side 2A of the sealing material 2 and the first partition portion 4A to define a plurality of second regions BS. Further, both ends of the first partition portion 4A respectively extend, for example, as shown in FIG. 8, to two sides 2B, 2C side which are joined to one side 2A of the sealing material 2 and, thereafter, extend along two sides 2B, 2C.

The constitution which makes the liquid crystal display panel of this embodiment 2 different from the liquid crystal display panel of the embodiment 1 lies in that the second regions BS are filled with the liquid crystal material 3 as shown in FIG. 8.

Further, the first substrate 101 includes, for example, the image display region DA on a surface of a transparent substrate such as a glass substrate. Within this image display region DA, although not shown in the drawings, elements which apply a voltage to a liquid crystal material such as TFT elements are arranged in an array. Further, on the second substrate 102, for example, within the image display region DA of a surface of a transparent substrate such as a glass substrate, color filters and the like are formed.

Further, the liquid crystal display panel of this embodiment 2 is also a general display panel which is used in a display device such as a liquid crystal display for a liquid crystal television receiver set or a personal computer. With respect to other constitutions and kinds of materials except for the partition member 4, the constitution and kinds of materials which are equal to the constitution and kinds of materials of a conventional liquid crystal display panel may be used. Accordingly, the explanation of the detailed constitution of the first substrate 101 and the second substrate 102, and materials of the sealing material 2 and the liquid crystal material 3 is omitted.

Further, the display device which uses the liquid crystal display panel of this embodiment 2 may be, for example, a display device of a liquid crystal display for a liquid crystal television receiver set or a personal computer and may have the constitution substantially equal to the constitution of the display device which uses conventional liquid crystal display panel and hence, the detailed explanation of the display device is omitted.

The liquid crystal display panel of this embodiment 2, that is, the liquid crystal display panel shown in FIG. 8 is, for example, a general display panel which is used as the display device such as a liquid crystal display for a liquid crystal television receiver set or a personal computer and, recently, the large sizing of such a liquid crystal display panel is in progress. Here, the liquid crystal display panel is, for example, manufactured by a method which adopts the liquid crystal material dropping method as explained in conjunction with the embodiment 1. Accordingly, in this embodiment 2, the detailed explanation of the manufacturing method of the liquid crystal display panel is omitted and only the constitutions which make this embodiment different from the embodiment 1 are explained.

In manufacturing the liquid crystal display panel of this embodiment 2, first of all, as explained in conjunction with the embodiment 1, the sealing material 2 is annularly applied to a surface of the first substrate 101 and, at the same time, for example, the partition member 4 having a pattern shown in FIG. 8 is applied. Here, the sealing material 2 and the partition member 4 are, for example, made of a thermosetting resin or an ultraviolet curing resin.

After applying the sealing material 2 and the partition member 4 to the surface of the first substrate 101, subsequently, as a next step, the liquid crystal material 3 is dropped in a region surrounded by the sealing material 2 on the surface of the first substrate 101. Here, in manufacturing the liquid crystal display panel of this embodiment 2, the liquid crystal material 3 is dropped in the whole region which is surrounded by the sealing material 2, that is, in the first region which includes the image display region DA and the second region which is surrounded by the partition member 4.

When the liquid crystal material 3 is dropped on the surface of the first substrate 101, the second substrate 102 is overlapped to the first substrate 101, and the sealing material 2 and the partition member 4 are hardened to adhere the first substrate 101 and the second substrate 102 to each other and, at the same time, the liquid crystal material 3 is hermetically sealed. By taking these steps, the liquid crystal display panel shown in FIG. 8 is obtained.

Figure 9:
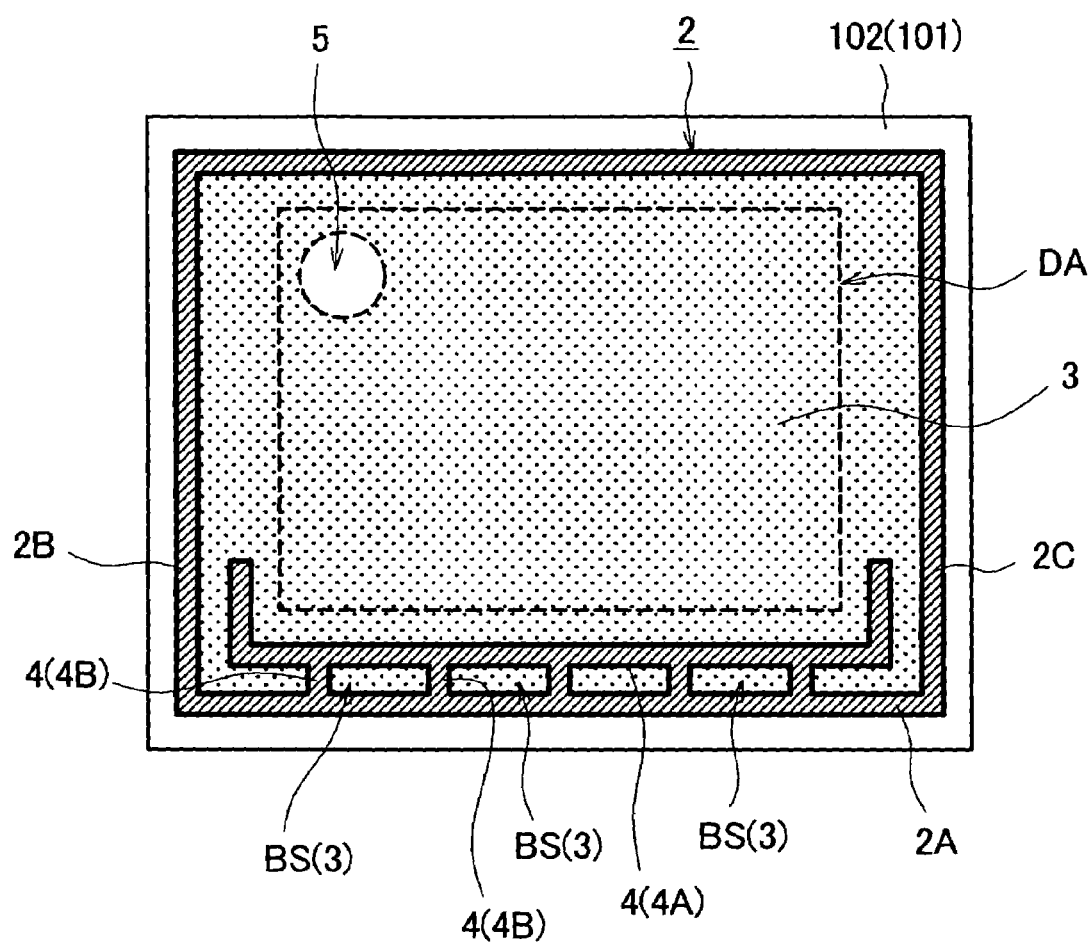
FIG. 9 is a schematic view for explaining one example of a defect which can be corrected using the liquid crystal display panel and the correcting method of the defect according to the second embodiment and also is a plan view showing one example of the defect which is generated.
Figure 10:
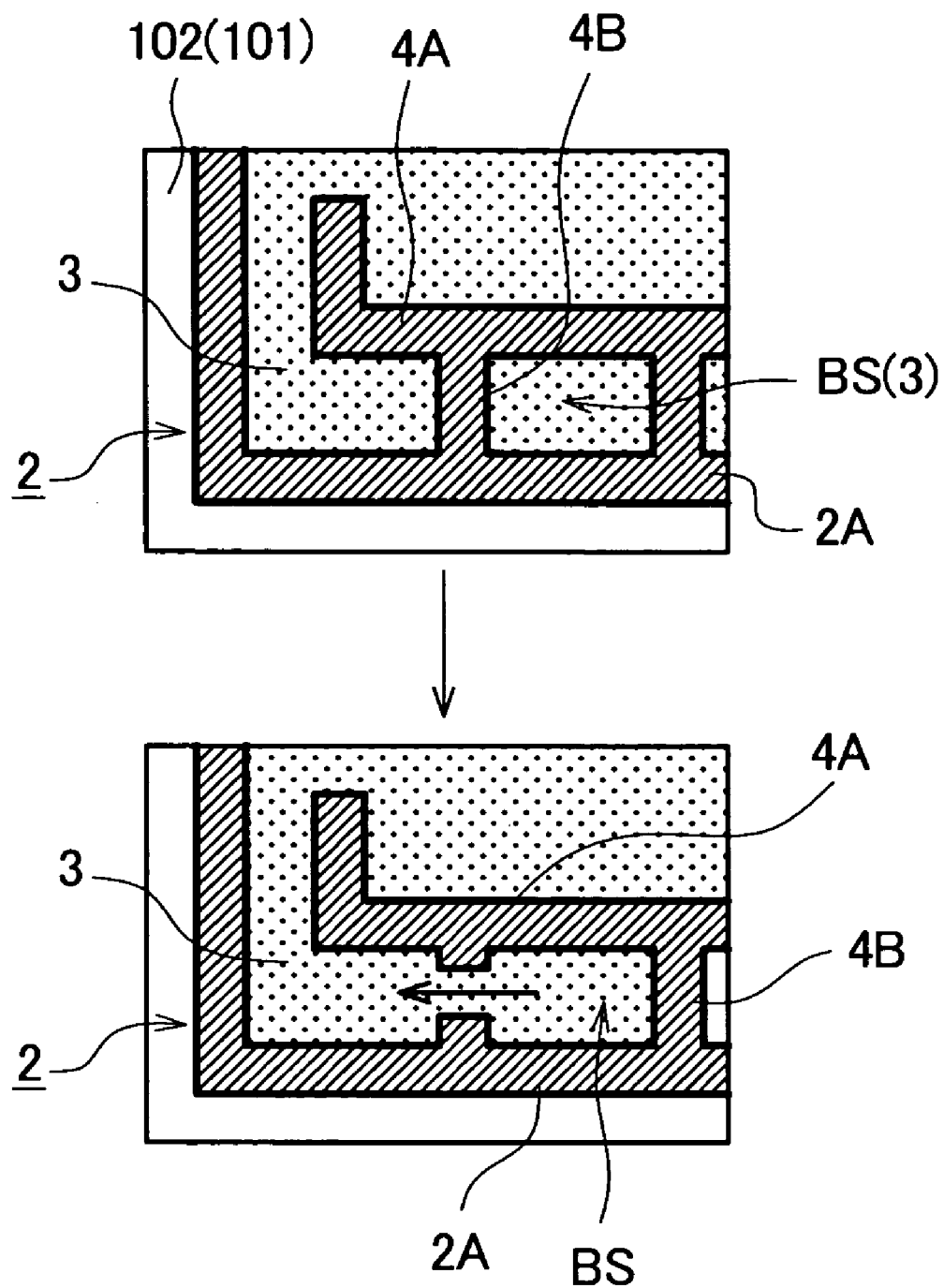
FIG. 10 is a schematic view for explaining one example of a defect which can be corrected using the liquid crystal display panel and the correcting method of the defect according to the second embodiment and also is a partially enlarged plan view with a part for explaining the correcting method.

FIG. 9 and FIG. 10 are perspective views for explaining one example of a defect which can be corrected using the liquid crystal display panel of this embodiment 2 and a correcting method of the defect, wherein FIG. 9 is a plan view showing one example of the generated defect and FIG. 10 is a partially enlarged plan view for explaining the correcting method.

When the liquid crystal material 3 is hermetically sealed (sealed) using the liquid crystal material dropping method as in the case of the manufacturing method of the liquid crystal display panel of this embodiment 2, the dropping quantity of the liquid crystal material 3 is, as described above, estimated and determined based on the height of the spacers and the area of the region surrounded by the sealing material 2. However, in dropping the liquid crystal material 3, there arise irregularities with respect to the dropping quantity. Accordingly, there may be a case that the dropping quantity of the liquid crystal material 3 is smaller than a preset dropping quantity and hence, for example, air bubbles shown in FIG. 9 or a defect which is referred to as wipe displacement (not shown in the drawings) may arise. When the air bubbles are generated or the wipe displacement occurs, for example, pixels which have no liquid crystal material 3 or an insufficient quantity of liquid crystal material 3 are formed and hence, an image quality of a displayed image is degraded at such portions.

In the manufacturing method of the liquid crystal display panel of this embodiment 2, when the air bubble is generated or the wipe displacement shown in FIG. 9 occurs after manufacturing the liquid crystal display panel in accordance with the above-mentioned steps, for example, as shown in an upper stage and lower stage of FIG. 10, out of the partition member 4, the second partition portion 4B which partitions the first region which includes the image display region DA and the above-mentioned second region BS is cut out so as to allow the second region BS to be spatially continuously formed with the first region. The cutting of the second partition portion 4B is performed by radiating laser beams to the second partition portion 4B, for example.

Here, when the second regions BS are filled with the liquid crystal material 3, as shown in the lower stage of FIG. 10, the liquid crystal material 3 of the second region BS flows into the first region which includes the image display region DA. In other words, a shortage amount of the liquid crystal material 3 which is sealed in the first region which includes the image display region DA is replenished with the liquid crystal material 3 which is filled in the second region BS. Accordingly, it is possible to easily correct the air bubble or the wipe displacement.

Here, when the second partition portion 4B which is cut out or in which an opening is formed is, for example, as shown in FIG. 8 and FIG. 10, arranged at a position spaced apart from the first partition portion 4A by a preset distance, for example, a cutting chip which is generated when the second partition portion 4B is cut using laser beams or the like hardly moves on the image display region DA and hence, a defective display of an image hardly occurs.

Further, although the detailed explanation is omitted, when the air bubble or the wipe displacement still remains after performing the correcting operation in accordance with steps shown in FIG. 10, for example, the second partition portion 4B which partitions the second region BS which is continuously formed with the first region which includes the image display region DA and another second region BS which is arranged close to the second region BS may be cut out.

When the dropping quantity of the liquid crystal material 3 becomes smaller than the preset dropping quantity, there arise irregularities also with respect to a shortage amount of the dropping quantity. Accordingly, for example, as shown FIG. 8, by providing the plurality of second regions BS filled with the liquid crystal material 3, it is possible to control the number (volume) of the second regions which are spatially continuously formed with the first region which includes the image display region DA corresponding to the shortage amount and hence, the proper correction can be performed.

As has been explained above, according to the liquid crystal display panel of this embodiment 2, at the time of manufacturing, by providing the second regions BS which are spatially separated and are formed independently from the first region which includes the image display region DA by the partition member 4 and by filling the second regions BS with the liquid crystal material 3, it is possible to easily correct the air bubble or the wipe displacement. Further, it is possible to suppress the lowering of a manufacturing yield rate of the liquid crystal display panel whereby the increase of a manufacturing cost of the liquid crystal display panel and a manufacturing cost of the display device which uses the liquid crystal display panel can be suppressed.

Particularly, in manufacturing the large-sized liquid crystal display panel such as a liquid crystal display for a liquid crystal television receiver set or a personal computer, it is difficult to suppress the dropping quantity of the liquid crystal material 3 within a range which prevents the occurrence of the air bubble or the wipe displacement. Accordingly, by adopting the constitution which can easily correct the air bubble or the wipe displacement as in the case of this embodiment 2, it is possible to suppress the lowering of the manufacturing yield rate of the liquid crystal display panel.

Further, for example, as shown in FIG. 8, by forming the second regions BS using the partition member 4 which is constituted of the first partition portion 4A arranged along the sealing material 2 and the second partition portion 4B which connects the sealing material 2 and the first partition portion 4A, it is possible to effectively make use of the space defined between the sealing material 2 and the image display region DA. Accordingly, for example, it is possible to provide the liquid crystal display panel which can easily correct the air bubble or the wipe displacement without increasing the area of the region which is surrounded by the sealing material 2, that is, the areas of two substrates 101, 102 for providing the second regions BS.

Further, for example, as shown in FIG. 8, by connecting the second partition portion 4B which partitions the first region which includes the image display region DA and the second region BS to the first partition portion 4A at the position spaced apart from the end of the first partition portion 4A by the preset distance, a cutting chip which is generated when the second partition portion 4B is cut hardly moves on the image display region DA and hence, the defective display of the image attributed to the cutting chip can be prevented.

Further, in this embodiment 2, as shown in FIG. 10, the second region BS is spatially continuously formed with the first region which includes the image display region DA by cutting out the second partition portion 4B. However, the spatial connection between the second region BS and the first region is not limited to such cutting of the second partition portion 4B. For example, the second region BS and the first region may be connected with each other by forming an opening in the second partition portion 4B, or a film which exists in an adhesive interface between either one of two substrates 101, 102 and the partition member 4 may be removed to spatially continuously connect the second region BS and the first region.

Further, in this embodiment 2, the partition member 4 is made of the same material as the sealing material 2 and the partition member 4 is applied simultaneously with the step in which the sealing material 2 is applied. However, the applying of the partition member 4 is not limited to such a mode, and the partition member 4 may be made of a material different from a material of the sealing material 2, and the partition member 4 may be applied or formed after applying the sealing material 2 and, at the same time, before dropping the liquid crystal material.

Further, in the embodiment 2 of the present invention, as a constitutional example of the liquid crystal display panel which includes the second regions BS, as shown in FIG. 8, there is shown an example in which four second regions BS having the substantially equal volume are provided. However, the present invention is not limited to such an example and it is sufficient that the liquid crystal display panel includes one or more second regions. Further, the partition member 4 is not limited to a shape shown in FIG. 8 and the partition member 4 may be formed in an annular shape which is separated from the sealing material 2, for example.

Further, as additional modifications, in forming the plurality of second regions BS, for example, as shown in FIG. 5, the volumes of the respective second regions BS may be made different from each other. Still further, for example, as shown in FIG. 7, one end of the first partition portion 4A of the partition member 4 may be connected to the sealing material 2.

Further, in FIG. 8, the partition member 4 is arranged at a lower portion on paper, that is, on a lower side of the image display region DA. However, the present invention is not limited to such an arrangement. That is, the partition member 4 may be formed on an upper side, a left end side or a right end side of the image display region DA.

Embodiment 3

Figure 11:
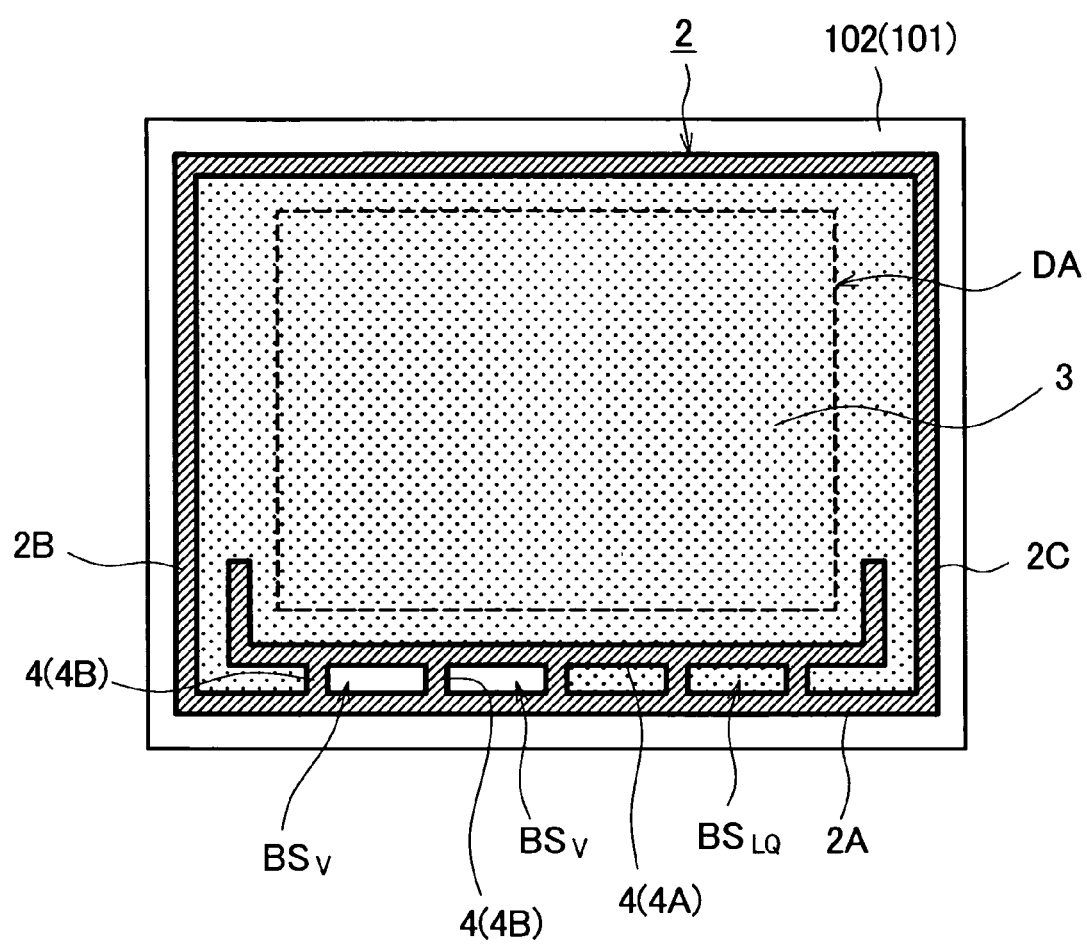
FIG. 11 is a schematic plan view showing the schematic constitution of a liquid crystal display panel according to a third embodiment of the present invention.

FIG. 11 is a schematic plan view showing the schematic constitution of a liquid crystal display panel according to a third embodiment of the present invention.

In the above-mentioned embodiment 1, the explanation is made with respect to the constitutional example of the liquid crystal display panel which can easily perform the correction of the defect when the defect which is referred to as gravitational shift occurs. On the other hand, in the above-mentioned embodiment 2, the explanation is made with respect to the constitutional example of the liquid crystal display panel which can easily perform the correction of the defect when the air bubbles are generated or the defect which is referred to as wipe displacement occurs. However, in actually manufacturing the liquid crystal display panel, until two substrates 101, 102 are adhered to each other using the sealing material 2 and, thereafter, the liquid crystal material 3 is filled in the space defined between two substrates, it is impossible to find out whether a defect occurs or not or whether the defect is the gravitational shift or the air bubble or the wipe displacement or not when the defect occurs. Accordingly, in this third embodiment, the explanation is made with respect to a constitutional example of the liquid crystal display panel which, when the liquid crystal display panel is manufactured, can easily perform the correction of the defect in both of the case in which the defect attributed to the excessive dropping quantity of the liquid crystal material such as gravitational shift occurs and the case in which the defect attributed to the shortage of dropping quantity of the liquid crystal material such as the air bubble or wipe displacement occurs.

The liquid crystal display panel of this embodiment 3 includes, for example, as shown in FIG. 11, two substrates consisting of a first substrate 101 and a second substrate 102, an annular sealing material 2 which separates a space defined between two substrates 101, 102 and a space outside the substrates 101, 102, a liquid crystal material 3 which is sealed in the inside of a space which is surrounded by two substrates 101, 102 and a sealing material 2, and a partition member 4 which forms one or more second regions BS in the inside of the space which is surrounded by two substrates 101, 102, and the sealing material 2 and outside an image display region DA. Here, the second region BS is, originally, in the same manner as the liquid crystal display panel of this embodiment 1, formed spatially separately and independently from the first region which includes the image display region DA by the partition member 4.

Further, the partition member 4 is, for example, as shown in FIG. 11, constituted of a first partition portion 4A along one side 2A of the sealing material 2, and second partition portions 4B which are connected with one side 2A of the sealing material 2 and the first partition portion 4A to define a plurality of second regions BS. Further, both ends of the first partition portion 4A respectively extend, for example, as shown in FIG. 11, to two sides 2B, 2C which are joined to one side 2A of the sealing material 2 and, thereafter, extend along two sides 2B, 2C.

The constitution which makes the liquid crystal display panels of this embodiment 3 different from the liquid crystal display panel of the embodiment 1 and the embodiment 2 lies in that, as shown in FIG. 11, the above-mentioned the plurality of second region BS are constituted of the second regions BSV in a vacuum state and second regions BSLQ which are filled with the liquid crystal material 3.

Further, the first substrate 101 includes, for example, the image display region DA on a surface of a transparent substrate such as a glass substrate. Within this image display region DA, although not shown in the drawings, elements which apply a voltage to a liquid crystal material such as TFT elements are arranged in an array. Further, on the second substrate 102, for example, within the image display region DA of a surface of a transparent substrate such as a glass substrate, color filters and the like are formed.

Further, the liquid crystal display panel of this embodiment 3 is also a general display panel which is used in a display device such as a liquid crystal display for a liquid crystal television receiver set or a personal computer. With respect to other constitutions and kinds of materials except for the partition member 4, the constitution and kinds of materials which are equal to the constitution and kinds of materials of a conventional liquid crystal display panel may be used. Accordingly, the explanation of the detailed constitution of the first substrate 101 and the second substrate 102, and materials of the sealing material 2 and the liquid crystal material 3 is omitted.

Further, the display device which uses the liquid crystal display panel of this embodiment 3 may be, for example, a display device of a liquid crystal display for a liquid crystal television receiver set or a personal computer and may have the constitution substantially equal to the constitution of the display device which uses a conventional liquid crystal display panel and hence, the detailed explanation of the display device is omitted.

The liquid crystal display panel of this embodiment 3, that is, the liquid crystal display panel shown in FIG. 11 is, for example, a general display panel which is used as the display device such as a liquid crystal display for a liquid crystal television receiver set or a personal computer and, recently, the large sizing of such a liquid crystal display panel is in progress. Here, the liquid crystal display panel is, for example, manufactured by a method which adopts the liquid crystal material dropping method as explained in conjunction with the embodiment 1. Accordingly, in this embodiment 3, the detailed explanation of the manufacturing method of the liquid crystal display panel is omitted and only the constitutions which make this embodiment different from the embodiment 1 are explained.

In manufacturing the liquid crystal display panel of this embodiment 3, first of all, as explained in conjunction with the embodiment 1, the sealing material 2 is annularly applied to a surface of the first substrate 101 and, at the same time, for example, the partition member 4 having a pattern shown in FIG. 8 is applied. Here, the sealing material 2 and the partition member 4 are, for example, made of a thermosetting resin or an ultraviolet curing resin.

After applying the sealing material 2 and the partition member 4 to the surface of the first substrate 101, subsequently, as a next step, the liquid crystal material 3 is dropped in a region surrounded by the sealing material 2 on the surface of the first substrate 101. Here, in manufacturing the liquid crystal display panel of this embodiment 3, the liquid crystal material 3 is dropped in the first region which includes the image display region DA and some of the second regions which are surrounded by the partition member 4 out of the region which is surrounded by the sealing material 2.

When the liquid crystal material 3 is dropped on the surface of the first substrate 101, the second substrate 102 is overlapped to the first substrate 101, and the sealing material 2 and the partition member 4 are hardened to adhere the first substrate 101 and the second substrate 102 to each other and, at the same time, the liquid crystal material 3 is hermetically sealed. By taking these steps, the liquid crystal display panel shown in FIG. 11 is obtained.

When the liquid crystal material 3 is hermetically sealed (sealed) using the liquid crystal material dropping method as in the case of the manufacturing method of the liquid crystal display panel of this embodiment 3, the dropping quantity of the liquid crystal material 3 is, as described above, estimated and determined based on the height of the spacers and the area of the region surrounded by the sealing material 2. However, in dropping the liquid crystal material 3, there arise irregularities with respect to the dropping quantity. Here, when the dropping quantity of the liquid crystal material 3 is larger than the preset dropping quantity, the gravitational shift occurs as explained in conjunction with the embodiment 1. On the other hand, when the dropping quantity of the liquid crystal material 3 is smaller than the preset dropping quantity, the air bubbles are generated or the wipe displacement occurs as explained in conjunction with the embodiment 2.

However, as described previously, until two substrates 101, 102 are adhered to each other by curing the sealing material 2, it is impossible to find out whether a defect occurs in the first region which includes the image display region DA or not or whether the defect is the gravitational shift or the air bubble or the wipe displacement or not when the defect occurs.

Accordingly, by providing the second regions BSV in a vacuum state and the second regions BSLQ which are filled with the liquid crystal material 3 as in the case of the liquid crystal display panel of this third embodiment, for example, when the gravitational shift occurs, as explained in conjunction with the embodiment 1, by cutting the second partition portion 4B which partitions the first region which includes the image display region DA and the second regions BSV in a vacuum state or forming the opening in such a second partition portion 4B, it is possible to easily correct the gravitational shift. Further, when the air bubbles are generated or when the wipe displacement occurs, as explained in conjunction with the embodiment 2, by cutting the second partition portion 4B which partitions the first region which includes the image display region DA and the second regions BSLQ which are filled with the liquid crystal material 3 or forming the opening in such a second partition portion 4B, it is possible to easily correct the air bubble or the wipe displacement.

Here, when the second partition portion 4B which is cut out or in which the opening is formed is, for example, as shown in FIG. 11, arranged at a position spaced apart from the first partition portion 4A by a preset distance, for example, a cutting chip which is generated when the second partition portion 4B is cut using laser beams or the like hardly moves on the image display region DA and hence, a defective display of an image hardly occurs.

As has been explained above, according to the liquid crystal display panel of this embodiment 3, at the time of manufacturing, by providing the second regions which are spatially formed independently from the first region which includes the image display region DA by the partition member 4 and by forming the second regions BSV in a vacuum state and the second regions BSLQ which are filled with the liquid crystal material 3, it is possible to easily perform the correction of the defect in both of the case in which the defect attributed to the excessive dropping quantity of the liquid crystal material such as gravitational shift occurs and the case in which the defect attributed to the shortage of dropping quantity of the liquid crystal material such as the air bubble or wipe displacement occurs. Accordingly, it is possible to suppress the lowering of a manufacturing yield rate of the liquid crystal display panel whereby the increase of a manufacturing cost of the liquid crystal display panel and a manufacturing cost of the display device which uses the liquid crystal display panel can be suppressed.

Particularly, in manufacturing the large-sized liquid crystal display panel such as a liquid crystal display for a liquid crystal television receiver set or a personal computer, it is difficult to suppress the dropping quantity of the liquid crystal material 3 within a range which prevents the occurrence of gravitational shift, the air bubble or the wipe displacement. Accordingly, by adopting the constitution which can easily correct the gravitational shift, the air bubble or the wipe displacement when any one of these defects occurs as in the case of this embodiment 3, it is possible to suppress the lowering of the manufacturing yield rate of the liquid crystal display panel.

Further, for example, as shown in FIG. 11, by forming the second regions BSV, BSLQ using the partition member 4 which is constituted of the first partition portion 4A arranged along the sealing material 2 and the second partition portion 4B which connects the sealing material 2 and the first partition portion 4A, it is possible to effectively make use of the space defined between the sealing material 2 and the image display region DA. Accordingly, for example, it is possible to provide the liquid crystal display panel which can easily correct the gravitational shift, the air bubble or the wipe displacement when any one of these defects occurs without increasing the area of the region which is surrounded by the sealing material 2, that is, the areas of two substrates 101, 102 for providing the second regions BS.

Further, for example, as shown in FIG. 11, by connecting the second partition portion 4B which separates the first region which includes the image display region DA and the second regions BS to the first partition portion 4A at the position spaced apart from the end of the first partition portion 4A by the preset distance, a cutting chip which is generated when the second partition portion 4B is cut hardly moves on the image display region DA and hence, the defective display of the image attributed to the cutting chip can be prevented.

Further, in this embodiment 3, the partition member 4 is made of the same material as the sealing material 2 and the partition member 4 is applied simultaneously with the step in which the sealing material 2 is applied. However, the applying of the partition member 4 is not limited to such a mode, and the partition member 4 may be made of a material different from a material of the sealing material 2, and the partition member 4 may be applied or formed after applying the sealing material 2 and, at the same time, before dropping the liquid crystal material.

Further, in place of spatially continuously forming the second regions BS with the first region which includes the image display region DA by cutting out the second partition portion 4B, for example, the second regions BS may be spatially continuously formed with the first region by forming an opening in the second partition portions 4B, or a film which exists on an adhesive interface between either one of two substrates 101, 102 and the partition member 4 may be removed to spatially connect the second regions BS and the first region.

Further, in the embodiment 3 of the present invention, as a constitutional example of the liquid crystal display panel which includes the second regions BS, as shown in FIG. 11, there is shown an example in which four second regions BS having the substantially equal volume are provided. However, the present invention is not limited to such an example and it is sufficient that the liquid crystal display panel includes two or more second regions. Further, the partition member 4 is not limited to a shape shown in FIG. 11 and the partition member 4 may be formed in an annular shape which is separated from the sealing material 2, for example.

Further, as additional modifications, in forming the plurality of second regions BS, for example, as shown in FIG. 5, the volumes of the respective second regions may be made different from each other.

Further, in FIG. 11, the partition member 4 is arranged at a lower portion on paper, that is, on a lower side of the image display region DA. However, the present invention is not limited to such an arrangement. That is, the partition member 4 may be formed on an upper side, a left end side or a right end side of the image display region DA. Further, the second regions BSLQ which are filled with the liquid crystal material 3 may be formed on the upper side of the image display region DA and the second regions BSV in a vacuum state may be formed on the lower side of the image display region DA.

Although the present invention has been specifically explained in conjunction with the embodiments, it is needless to say that the present invention is not limited to the above-mentioned embodiments and various modifications are conceivable without departing from the gist of the present invention.

What is claimed is:

1. A liquid crystal display device comprising:
   two substrates which are arranged to face each other in an opposed manner;
   a liquid crystal material which is sandwiched between two substrates;
   an annular sealing material which is arranged on peripheries of the substrates;
   a first region which is surrounded by the sealing material and includes an image display region; and
   at least one second region which is at least initially separated from the first region by a partition member.

2. A liquid crystal display device according to claim 1, wherein the liquid crystal display device includes a plurality of second regions and a filling rate of the liquid crystal material in one second region differs from the filling rate of the liquid crystal material in another second region.

3. A liquid crystal display device according to claim 1, wherein the partition member includes a first partition portion which is arranged along the annular sealing material and at least two second partition portions attached to the first partition portion.

4. A liquid crystal display device according to claim 1, wherein the partition member is initially a member without openings therethrough when the first and the second regions are initially formed, and has at least one opening in a form of at least one gap formed in the partition member after forming the first and the second regions, so as to enable the liquid crystal material in the first region and the liquid crystal material in the second region to communicate with each other through the gap.

5. A liquid crystal display device comprising:
two substrates which are arranged with a liquid crystal material sandwiched therebetween;
a display part formed on one substrate;
a first sealing material which is formed on a periphery of the display part, and
arranged to surround a first region; and
a second sealing material which surrounds at least one second region different from the first region;
wherein the second region is arranged to be spatially independent and at least initially separated from the first region by the second sealing material.

6. A liquid crystal display device according to claim 5, wherein the second sealing material includes a filling port.

7. A liquid crystal display device according to claim 1, wherein at least one second region includes at least one small space region at least initially separated from the first region.

8. A liquid crystal display device according to claim 1, wherein the partition member is initially a member without openings therethrough when the first and the second regions are initially formed, and has at least one opening in a form of at least one gap formed after forming the first and the second regions so as to enable communication of the liquid crystal material between the first and the second regions and compensation of an irregularity in the liquid crystal material in the first region.

9. A liquid crystal display device according to claim 5, wherein at least one second region includes at least one small space region at least initially separated from the first region.

10. A liquid crystal display device according to claim 5, wherein the second sealing material is initially formed without openings therethrough when the first and the second regions are initially formed, and has at least one opening in a form of at least one gap formed after forming the first and the second regions so as to enable communication of the liquid crystal material between the first and the second regions through the gap and compensation of an irregularity in the liquid crystal material in the first region.

* * * * *